Sept. 26, 1933.  C. H. HAPGOOD  1,928,424
VACUUM MILK RECEIVER
Filed June 20, 1931

WITNESS:
Rob't R Kitchel.

INVENTOR
Cyrus Howard Hapgood
BY
Busser and Harding
ATTORNEYS

Patented Sept. 26, 1933

1,928,424

UNITED STATES PATENT OFFICE 1,928,424

VACUUM MILK RECEIVER

Cyrus Howard Hapgood, Nutley, N. J., assignor to The De Laval Separator Company, New York, N. Y., a corporation of New Jersey Application June 20, 1931. Serial No. 545,674

1 Claim. (Cl. 220—63)

In certain cow milking processes, the milk from the cow flows into a receiving tank which is under a partial vacuum, the maintenance of such vacuum being a necessary feature of the milking apparatus. It is necessary that the bottom and inner wall of the tank and the bottom of the cover shall be of a material that will not contaminate the milk and that will itself resist corrosion by the milk. A tank made of iron or steel will not meet these requirements. A lining of glass is too expensive, and any break in the glass destroys its utility. A tank made of nickel, or high chrome steel, or high nickel chrome steel, or Monel metal, or certain copper-tin alloys, would have a non-corrosive surface, but the expense would be prohibitive. Plating the internal surfaces of the container is not practicable, since no plated surface would be durable. The only practicable and economical expedient has seemed to be to apply a lining of non-corrosive metal, of which examples are given above, or other non-corrosive material, to the inner surfaces of the container. This would be a satisfactory solution of the problem if the tank were not subjected to vacuum. It has been found, however, that the lining of non-corrosive material, especially that applied to the cover, soon buckles. This occurs by reason of the fact that air leaks and accumulates between the body and the lining and, due to differential pressures, the lining is forced away from the body and its utility thus destroyed.

I have found it possible to utilize a lining as above described and prevent the buckling thereof by resorting to the expedient of connecting the back surface of the lining with a source of vacuum, thereby balancing the pressures on the front or exposed surface of the lining and on the rear surface thereof. This expedient is eminently practicable, since all that is required is the provision of an extra pipe and its connection with the main vacuum line which already exists as a necessary part of the apparatus. It is believed, also, to be necessary that the inner face of the cover body, or the inner face of the lining, or both, should be rough, in order to provide a multitude of interconnected channels, which may be of nearly negligible depth, between the lining and the body, all of which will be in communication with the special pipe. It is not necessary to subject either of these surfaces to any special roughening operation. All that is advisable is to avoid providing opposing surfaces which are so perfectly smooth as to exclude the penetration of the partial vacuum to points remote from the point of connection with the special vacuum pipe. A slightly rough surface, such as would be provided in the ordinary process of manufacture, of the body, with avoidance of any subsequent polishing or smoothing operation, is all that is required.

An embodiment of the invention is shown in the accompanying drawing, in which—

Figure 1:
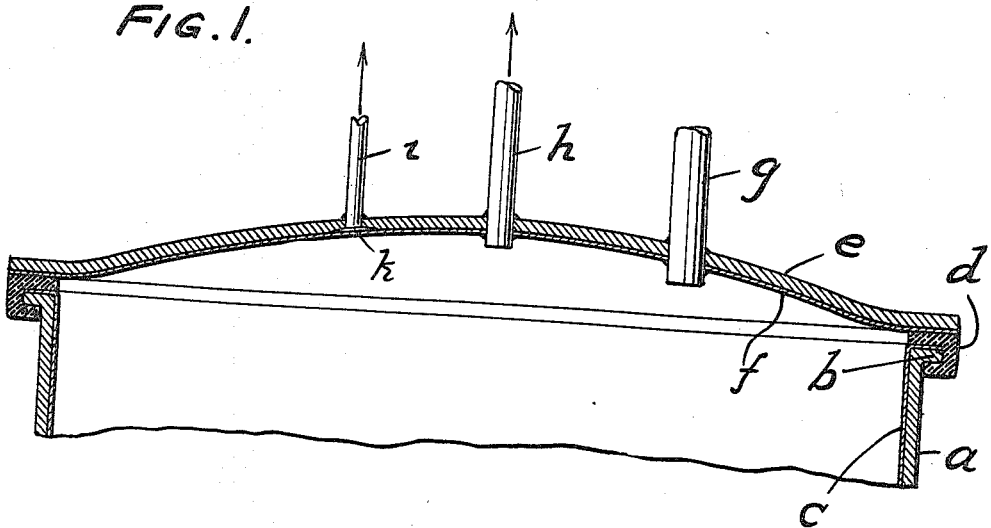
Fig. 1 is a vertical section through the upper part of the tank.
Figure 3:
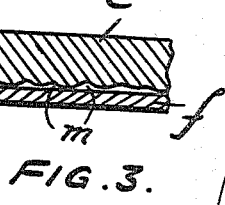
Fig. 3 is an enlarged detail section, illustrating, in a somewhat exaggerated form, the irregular inner surface of the cover body.
Figure 2:
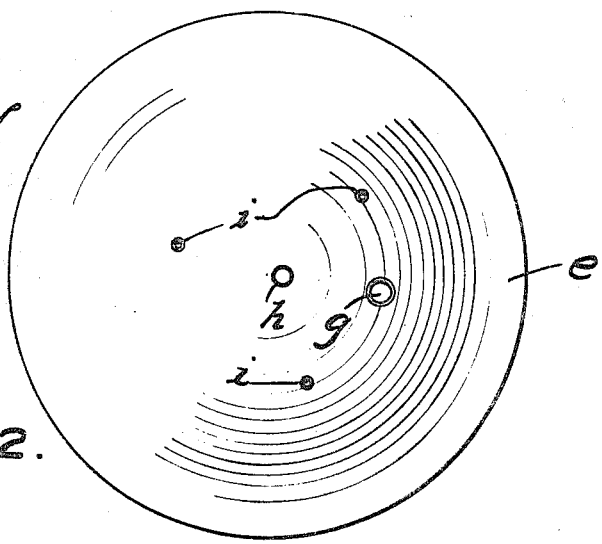
Fig. 2 is a plan view of the cover on a reduced scale.

The cylindrical body $a$ of the tank is provided with a lining $c$, which is bent down over an upper annular flange $b$ on the body. A gasket $d$ extends over, outside and below the flange $b$. The cover $e$, provided with a lining $f$, rests upon the gasket $d$, being held tightly in position, when the tank is under vacuum, by the pressure of the atmosphere.

A milk inlet pipe $g$ extends through the cover body $e$ and its lining $f$ and may be secured in position by welding inside and outside. A vacuum pipe $h$, connected with the source of suction, is similarly positioned and secured. A vacuum pipe $i$ (which may be in communication with the same source of suction) extends through the cover body but not through the lining and may be secured to the cover body by being welded to the outside thereof. It is desirable to provide in the cover body a shallow recess $k$ communicating with vacuum pipe $i$.

In operation, as soon as the vacuum is applied to the interior of the tank through pipe $h$, a similar vacuum is applied to the back of the lining, the air being exhausted from the almost infinite number of passages $m$ of almost negligible depth between the cover and its lining, so as to prevent any unbalancing of pneumatic pressures tending to draw the lining away from the body of the cover.

It is also practicable to connect the pipe $i$ with a source of higher vacuum than that to which pipe $h$ is connected, thereby providing an absolute pressure serving to even more securely hold the lining against its seat.

It is sometimes desirable to provide several pipes $i$ and secure them in position at relatively widely spaced apart points. Similar special vacuum pipes may also be applied to the cylindrical body of the tank. My invention contemplates the application of the special vacuum pipe to the cover alone, or to the cover and tank body, or in exceptional cases to the tank body alone. In all cases the construction may be the same as that described. It is intended that the term "tank wall" shall include any wall of the tank including the removable cover.

Having now fully described my invention, what I claim and desire to protect by Letters Patent is:

A vacuum tank for receiving, accumulating and holding milk which comprises a wall composed of a single body wall and a lining of non-corrosive metal in fixed relation and contact with the body, a pipe adapted for connection with a source of milk and a vacuum pipe adapted for connection with a source of suction, both opening into the interior of the tank, and a special vacuum pipe adapted for connection with a source of suction and extending through the body wall but not through the lining, the body wall being imperforate except for the extension therethrough of the milk pipe and the first named vacuum pipe, the inner face of the wall body being sufficiently rough to allow withdrawal of air from between the body wall and lining throughout a considerable area surrounding the inlet to the special vacuum pipe.

CYRUS HOWARD HAPGOOD.